US007821747B2

(12) United States Patent
Gill

(10) Patent No.: US 7,821,747 B2
(45) Date of Patent: Oct. 26, 2010

(54) METHOD AND APPARATUS FOR PROVIDING IMPROVED PINNING STRUCTURE FOR TUNNELING MAGNETORESISTIVE SENSOR

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1201 days.

(21) Appl. No.: 11/351,768

(22) Filed: Feb. 10, 2006

(65) Prior Publication Data

US 2007/0188938 A1 Aug. 16, 2007

(51) Int. Cl.
G11B 5/33 (2006.01)
G11B 5/127 (2006.01)
(52) U.S. Cl. .................................. 360/324.2
(58) Field of Classification Search .......... 360/324, 360/324.1, 324.11, 324.12, 324.2
See application file for complete search history.

(56) References Cited

U.S. PATENT DOCUMENTS

| | | | | |
|---|---|---|---|---|
| 6,052,263 A * | 4/2000 | Gill | ........................ | 360/324.11 |
| 6,252,750 B1 * | 6/2001 | Gill | ........................ | 360/324.11 |
| 6,271,997 B1 * | 8/2001 | Gill | ........................... | 360/314 |
| 6,275,363 B1 * | 8/2001 | Gill | ........................ | 360/324.2 |
| 6,473,275 B1 * | 10/2002 | Gill | ........................... | 360/314 |
| 6,538,859 B1 * | 3/2003 | Gill | ........................ | 360/324.12 |
| 6,606,781 B1 * | 8/2003 | Gill | ........................ | 29/603.08 |
| 6,621,665 B1 * | 9/2003 | Gill | ........................ | 360/324.11 |
| 6,633,461 B2 * | 10/2003 | Gill | ........................... | 360/314 |
| 6,643,915 B2 * | 11/2003 | Gill | ........................ | 29/603.14 |
| 6,649,960 B1 | 11/2003 | Cross | | |
| 6,674,617 B2 * | 1/2004 | Gill | ........................ | 360/324.12 |
| 6,785,102 B2 * | 8/2004 | Freitag et al. | ........... | 360/324.11 |
| 6,802,114 B2 * | 10/2004 | Gill | ........................ | 29/603.07 |
| 6,847,547 B2 * | 1/2005 | Albert et al. | ................. | 365/173 |
| 6,866,751 B2 * | 3/2005 | Gill et al. | ................. | 204/192.2 |
| 7,116,529 B2 * | 10/2006 | Yoshikawa et al. | ........ | 360/324.1 |
| 7,130,166 B2 * | 10/2006 | Gill | ........................ | 360/324.12 |
| 7,233,039 B2 * | 6/2007 | Huai et al. | ................... | 257/295 |
| 7,256,971 B2 * | 8/2007 | Horng et al. | ........... | 360/324.11 |
| 7,370,404 B2 * | 5/2008 | Gill et al. | ................. | 29/603.08 |
| 7,397,637 B2 * | 7/2008 | Gill | ........................ | 360/324.12 |
| 7,423,848 B2 * | 9/2008 | Horng et al. | ............. | 360/324.1 |
| 2002/0044397 A1 * | 4/2002 | Noma et al. | ........... | 360/324.11 |
| 2003/0016475 A1 * | 1/2003 | Hoshiya et al. | .......... | 360/324.1 |
| 2003/0128483 A1 | 7/2003 | Kamijo | | |
| 2004/0008450 A1 * | 1/2004 | Gill | ........................... | 360/314 |
| 2005/0009211 A1 | 1/2005 | Linn et al. | | |
| 2005/0110004 A1 | 5/2005 | Parkin et al. | | |
| 2005/0249979 A1 * | 11/2005 | Gill | ........................ | 428/828 |

OTHER PUBLICATIONS

Wang, et al., 70% TMR at Room Temperature for SDT Sandwich Junctions with CoFeB as Free and Reference Layers; Jul. 2004; pp. 2269-2271;vol. 40, No. 4.

* cited by examiner

Primary Examiner—Brian E Miller
(74) Attorney, Agent, or Firm—Merchant & Gould

(57) ABSTRACT

A method and apparatus for providing improved pinning structure for tunneling magnetoresistive sensor is disclosed. A three layer pinned structure is used, wherein the second pinned layer is designed to balance the effects of the first and third pinned layers.

19 Claims, 7 Drawing Sheets

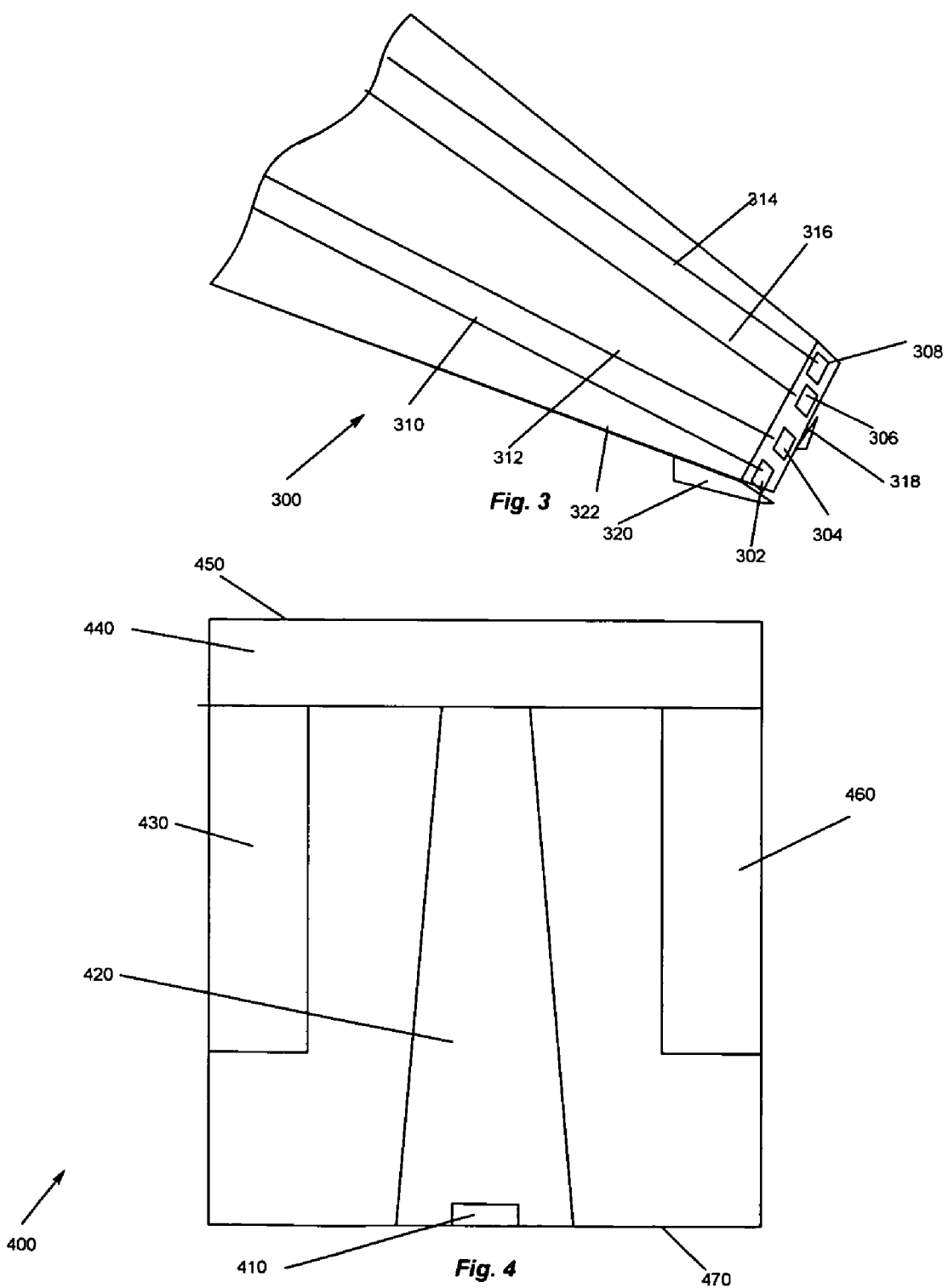

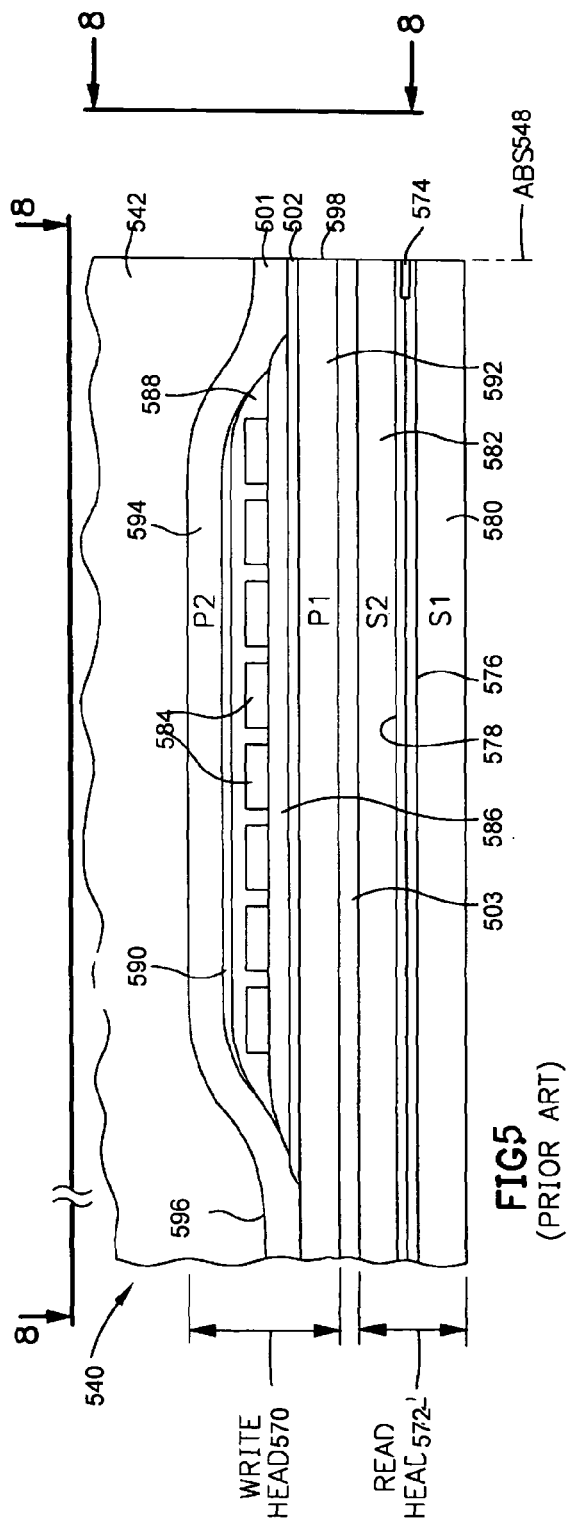
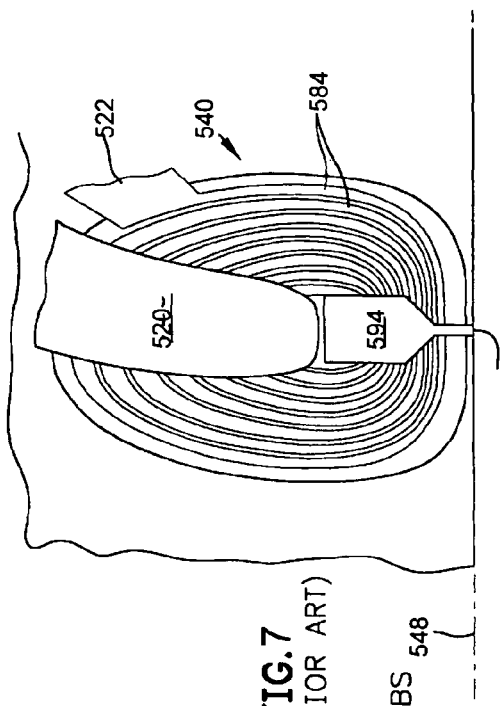
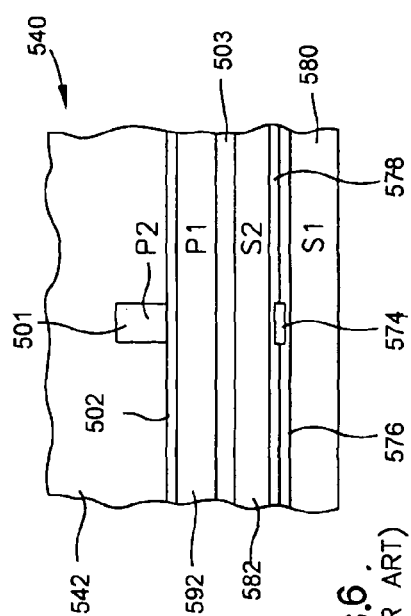
FIG. 5 (PRIOR ART)
FIG. 7 (PRIOR ART)
FIG. 6 (PRIOR ART)

METHOD AND APPARATUS FOR PROVIDING IMPROVED PINNING STRUCTURE FOR TUNNELING MAGNETORESISTIVE SENSOR

BACKGROUND OF THE INVENTION

1. Field of the Invention

This invention relates in general to magnetic read sensors, and more particularly to a method and apparatus for providing improved pinning structure for tunneling magnetoresistive sensor.

2. Description of Related Art

The heart of a computer is typically a magnetic disk drive which includes a rotating magnetic disk, a slider that has write and read heads, a suspension arm above the rotating disk and an actuator arm. The suspension arm biases the slider into contact with a parking ramp or the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

Most "giant magnetoresistive" (GMR) devices have been designed so as to measure the resistance of the free layer for current flowing parallel to the film's plane. However, as the quest for ever greater densities continues, devices that measure current flowing perpendicular to the plane (CPP) have begun to emerge. A device that is particularly well suited to the CPP design is the magnetic tunneling junction (MTJ) in which the layer that separates the free and pinned layers is a non-magnetic insulator, such as alumina or silica. Its thickness needs to be such that it will transmit a significant tunneling current. The principle governing the operation of the MTJ is the change of resistivity of the tunnel junction between two ferromagnetic layers. When the magnetization of the two ferromagnetic layers is in opposite directions, the tunneling resistance increases due to a reduction in the tunneling probability.

A sensor includes a nonmagnetic electrically conductive or electrically nonconductive material spacer layer sandwiched between a ferromagnetic pinned layer and a ferromagnetic free layer. An antiferromagnetic pinning layer typically interfaces the pinned layer for pinning the magnetic moment of the pinned layer 90.degree to an air bearing surface (ABS) wherein the ABS is an exposed surface of the sensor that faces the rotating disk. The sensor is located between ferromagnetic first and second shield layers.

A magnetic moment of the free layer is free to rotate upwardly and downwardly with respect to the ABS from a quiescent or zero bias point position in response to positive and negative magnetic field signals from the rotating magnetic disk. The quiescent position of the magnetic moment of the free layer, which is parallel to the ABS, is when the current is conducted through the sensor without magnetic field signals from the rotating magnetic disk.

When the free layer is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field. If the direction of the pinned field is parallel to the free layer, electrons passing between the free and pinned layers, suffer less scattering. Thus, the resistance at this state is lower. If, however, the magnetization of the pinned layer is anti-parallel to that of the free layer, electrons moving from one layer into the other will suffer more scattering so the resistance of the structure will increase.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor.

In order to increase data density and data rate even further, in recent years researchers have focused on the use of tunnel junction (TMR) sensors or tunnel valve. A TMR read sensor is similar in structure to a "giant magnetoresistive" (GMR) spin valve, but the physics of the device are different. For a TMR read sensor, rather than using a spacer layer, a barrier layer is positioned between the free layer and a synthetic antiferromagnet (SAF). Electrons must tunnel through the barrier layer. A tunnel valve operates based on quantum mechanical tunneling of electrons through the insulating spacer layer. This tunneling is maximized when the magnetizations of the free and pinned layers are parallel to one another adjacent to the spacer layer.

Both GMR sensors and TMR sensors require a mechanism for maintaining the pinned layer in its pinned state. Traditionally, this has been achieved by depositing the pinned layer such that it is exchange coupled with an antiferromagnetic material such as for example PtMn. Although an antiferromagnetic material in and of itself is not magnetic, when exchange coupled with a magnetic material it very strongly fixes the magnetization of the magnetic layer, In order to effectively fix the magnetization of the pinned layer, the antiferromagnetic layer must be very thick as compared with the other layers of the sensor. Ever increasing recording density requirements require ever smaller gap height and therefore thinner sensors. The thick AFM layer is a significant cost to the thickness budget. Also, antiferromagnetic materials lose their antiferromagnetic properties at a given temperature called the blocking temperature. Therefore, certain events such as an electrostatic discharge or a slider contacting the disk can elevate the temperature of the AFM sufficiently to lose the pinning of the pinned layer. Such an event renders the head useless.

In order to further improve pinning of the pinned layer, heads have recently been constructed with anti-parallel coupled pinned layers (AP coupled pinned layers). In such a sensor the pinned layer consists of a pair of ferromagnetic layers separated by a non-magnetic coupling layer such as Ru. The ferromagnetic layers are usually constructed to have magnetic thicknesses that are close to each other but not exactly the same. The antiparallel magnetostatic coupling of the two ferromagnetic layers greatly increases the pinning, and the slight difference in magnetic thicknesses creates a net magnetism that allows magnetic orientation of the AP coupled pinned layer to be set in a magnetic field. In such an AP coupled pinned layer, the ferromagnetic layer furthest from the sensor's spacer layer is exchange coupled with an AFM as discussed in the preceding paragraph.

Even more recently, in order to minimize sensor height and thereby increase data density, attempts have been made to construct sensors in which the pinned layer does not require exchange coupling to an AFM. In such a sensor, two antiparallel coupled ferromagnetic layers are constructed to have as close as possible a magnetic thickness. The closer the magnetic thickness, the stronger the magnetostatic coupling between the layers. The antiparallel coupled layers are also constructed of a material having a strong positive magnetostriction. Magnetostriction is the property of a material that it is magnetized in a particular direction when placed under a compressive stress. The construction of the head generates a certain amount of compressive stress on the sensor which, when combined with the magnetostriction of the pinned layers, assists pinning. Such self-pinned sensors have shown promise in greatly decreasing the thickness of the sensor, however they suffer from instability. The pinned layers of such sensor have been prone to flip direction, a catastrophic event that renders the head useless.

In particular, a TMR sensor that uses CoFeB amorphous layer as the reference layer in conjunction with MgO as the barrier layer has shown an improved TMR ratio. The sensitivity to the magnetic data is measured in the TMR ratio, defined as the ratio between the resistivity values with and without a magnetic field. More particularly, the resistance change rate (TMR ratio; $\Delta R_{TMR}$) of the tunneling magnetoresistive sensor is expressed by $2P_P P_F/(1-P_P P_F)$. Herein, $P_P$ represents a spin polarization rate (i.e., difference in the number of electrons between upward spins and downward spins, which is normalized based on the total number of electrons; referred to simply as a "polarization rate" hereinafter) of the pinned magnetic layer. $P_F$ represents a polarization rate of the free magnetic layer. As seen from that formula, the resistance change rate is determined depending on the polarization rate of the ferromagnetic layer. Theoretically, the resistance change rate is increased as the polarization rate increases. However, a CoFeB amorphous layer has a large magnetostriction constant, which is undesirable for pinning.

It can be seen then that there is a need for a method and apparatus for providing improved pinning structure for tunneling magnetoresistive sensor.

SUMMARY OF THE INVENTION

To overcome the limitations described above, and to overcome other limitations that will become apparent upon reading and understanding the present specification, the present invention discloses a method and apparatus for providing improved pinning structure for tunneling magnetoresistive sensor.

The present invention solves the above-described problems by using a three layer pinning structure wherein the second pinned layer is designed to balance the effects of the first and third pinned layers.

A read sensor in accordance with the principles of the present invention includes an antiferromagnetic layer, a pinned layer, the pinned layer further including a first, second and third antiparallel layer, a free layer and a barrier layer disposed between the free layer and the pinned layer, wherein the first antiparallel layer includes a composition selected to maximize coupling with the antiferromagnetic layer, the third antiparallel layer includes a composition selected to maximizes a Tunnel-Magnetoresistance, and wherein the second antiparallel layer is disposed between the first and third antiparallel layers and includes a composition selected to balance the stressed induced anisotropy of the first and third antiparallel layers.

In another embodiment of the present invention, a magnetic storage device is provided. The magnetic storage device includes a magnetic media for storing data thereon, a motor, coupled to the magnetic media, for translating the magnetic media, a transducer for reading and writing data on the magnetic media and an actuator, coupled to the transducer, for moving the transducer relative to the magnetic media, wherein the transducer includes a read sensor including an antiferromagnetic layer, a pinned layer, the pinned layer further including a first, second and third antiparallel layer, a free layer and a barrier layer disposed between the free layer and the pinned layer, wherein the first antiparallel layer includes a composition selected to maximize coupling with the antiferromagnetic layer, the third antiparallel layer includes a composition selected to maximizes a Tunnel-Magnetoresistance, and wherein the second antiparallel layer is disposed between the first and third antiparallel layers and includes a composition selected to balance the stressed induced anisotropy of the first and third antiparallel layers.

In another embodiment of the present invention, a method for forming a read sensor is provided. The method for forming a read sensor includes forming a pinning layer, forming a pinned layer having a first, second and third antiparallel layer abutting the pinning layer, wherein the design of the second layer, disposed between the first and third antiparallel layers, is selected to maximize tunnel-magnetoresistance and pinning while minimizing sensitivity to external stress, forming a barrier layer abutting the pinned layer and forming a free layer abutting the barrier layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

FIG. 5 is a side cross-sectional elevation view of a magnetic head;

FIG. 6 is an air bearing surface (ABS) view of the magnetic head of FIG. 5;

FIG. 7 illustrates the connect leads coupled to the coil for the write pole piece;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing improved pinning structure for tunneling magnetoresistive sensor. A three layer pinned structure is used, wherein the second pinned layer is designed to balance the effects of the first and third pinned layers.

Figure 1:
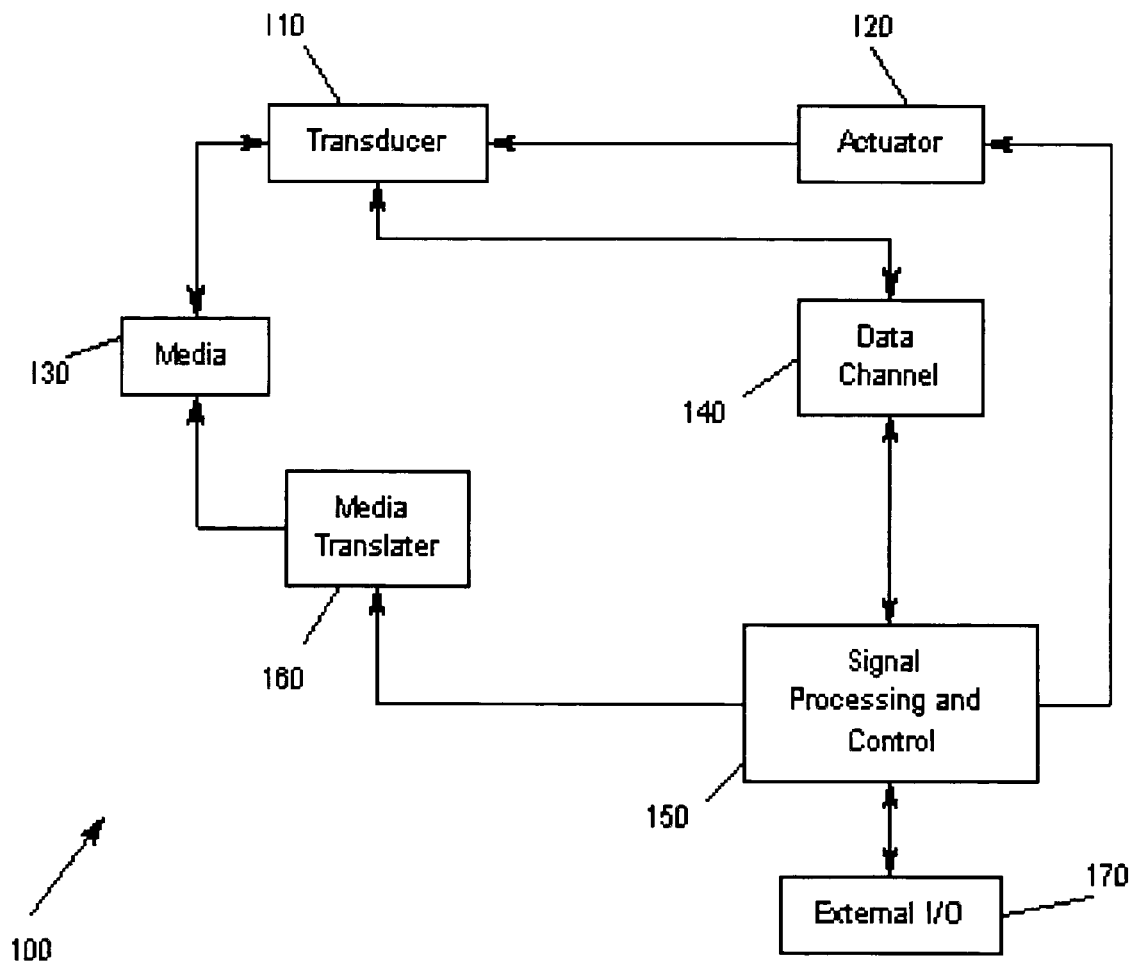
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
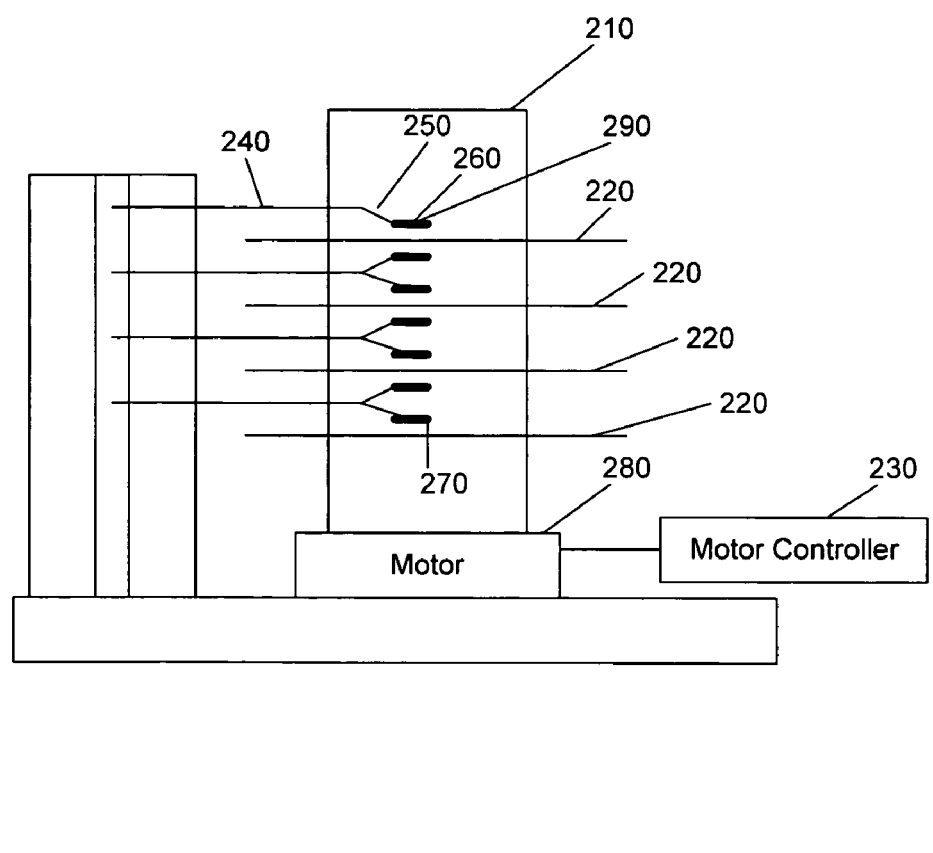
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

FIG. 5 is a side cross-sectional elevation view of a magnetic head 540. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current Is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

FIG. 7 illustrates a view of the connect leads 520, 522 coupled to the coil 584 for the write pole piece 594. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
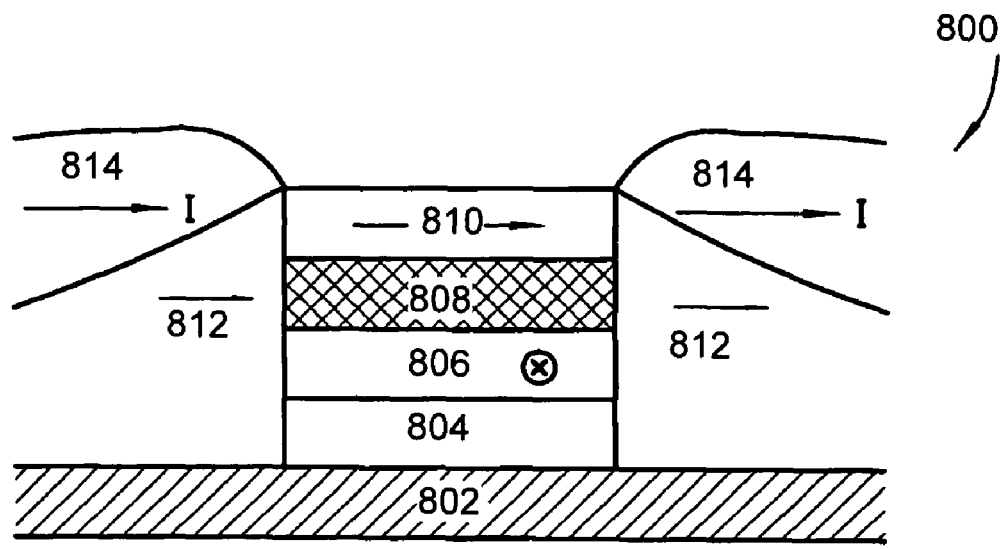
FIG. 8 illustrates the basic components of a typical current-in-plane (CIP) GMR sensor according to one embodiment of the present invention.

FIG. 8 illustrates the basic components of a typical current-in-plane (CIP) GMR sensor 800 according to one embodiment of the present invention. The sensor 800 includes a ferromagnetic reference layer 806 with a fixed transverse magnetic moment (pointing into the page) and a ferromagnetic free layer 810 with a rotatable magnetization vector, which can rotate about the longitudinal direction in response to transverse magnetic signal fields. The direction of the magnetic moment of the reference layer 806 is typically fixed by exchange coupling with an antiferromagnetic layer 804. Exchange-pinned reference layer 806 and free layer 810 are separated by a thin electrically conductive nonmagnetic layer 808. Hard bias layers 812 provide a longitudinal biasing magnetic field to stabilize the magnetization of the free layer 810 approximately in a longitudinal orientation in the absence of other external magnetic fields. Sensor 800 further includes top electrical leads 814 in proximity with hard bias layers 812, and a layer 802 adjacent to the antiferromagnetic layer 804, which represents a combination of the substrate, undercoat, and seed layers. For a shielded sensor, layer 802 may additionally include the bottom shield and insulation layers (for CIP sensors) or electrical contact layers (for CPP sensors).

Figure 9:
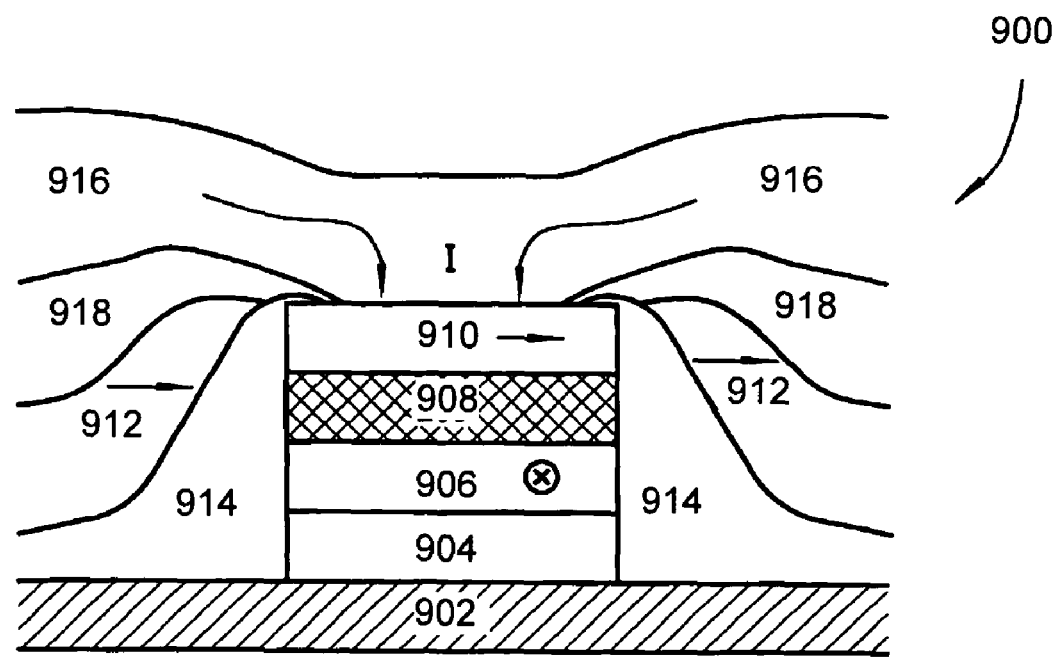
FIG. 9 shows a current-perpendicular-to-plane (CPP) sensor according to one embodiment of the present invention.

FIG. 9 shows a current-perpendicular-to-plane (CPP) sensor 900 according to one embodiment of the present invention. CPP sensor 900 includes a ferromagnetic reference layer 906 with a fixed magnetic moment oriented transversely (into the page) and a ferromagnetic free layer 910 with a rotatable magnetization vector, which can rotate about the longitudinal direction in response to transverse magnetic signal fields. The direction of the magnetic moment of the reference layer 906 is typically fixed by exchange coupling with an antiferromagnetic layer 904. The exchange-pinned reference layer 906 and free layer 910 are spaced apart by a non-magnetic layer 908. For MTJ devices, layer 908 includes an electrically insulating tunnel barrier layer. For CPP-GMR devices, layer 908 is electrically conductive, and is analogous to layer 808 of the CIP-GMR sensor of FIG. 8. Hard bias layers 912 are electrically insulated from the sensor stack and the top electrical lead 916 by insulating layers 914 and 918 respectively. Hard bias layers 912 provide a longitudinal biasing magnetic field to stabilize the magnetization of the free layer 910. Sensor 900 further includes a layer 902, which is similar to layer 802 of sensor 800, in proximity with the antiferromagnetic layer 904.

The above description of a CPP magnetic sensor, shown in the accompanying FIG. 8, is for presentation purposes only. Those skilled in the art will recognize that other embodiments that provide CPP sensors are possible, including dual sensor structures, etc.

Figure 10:
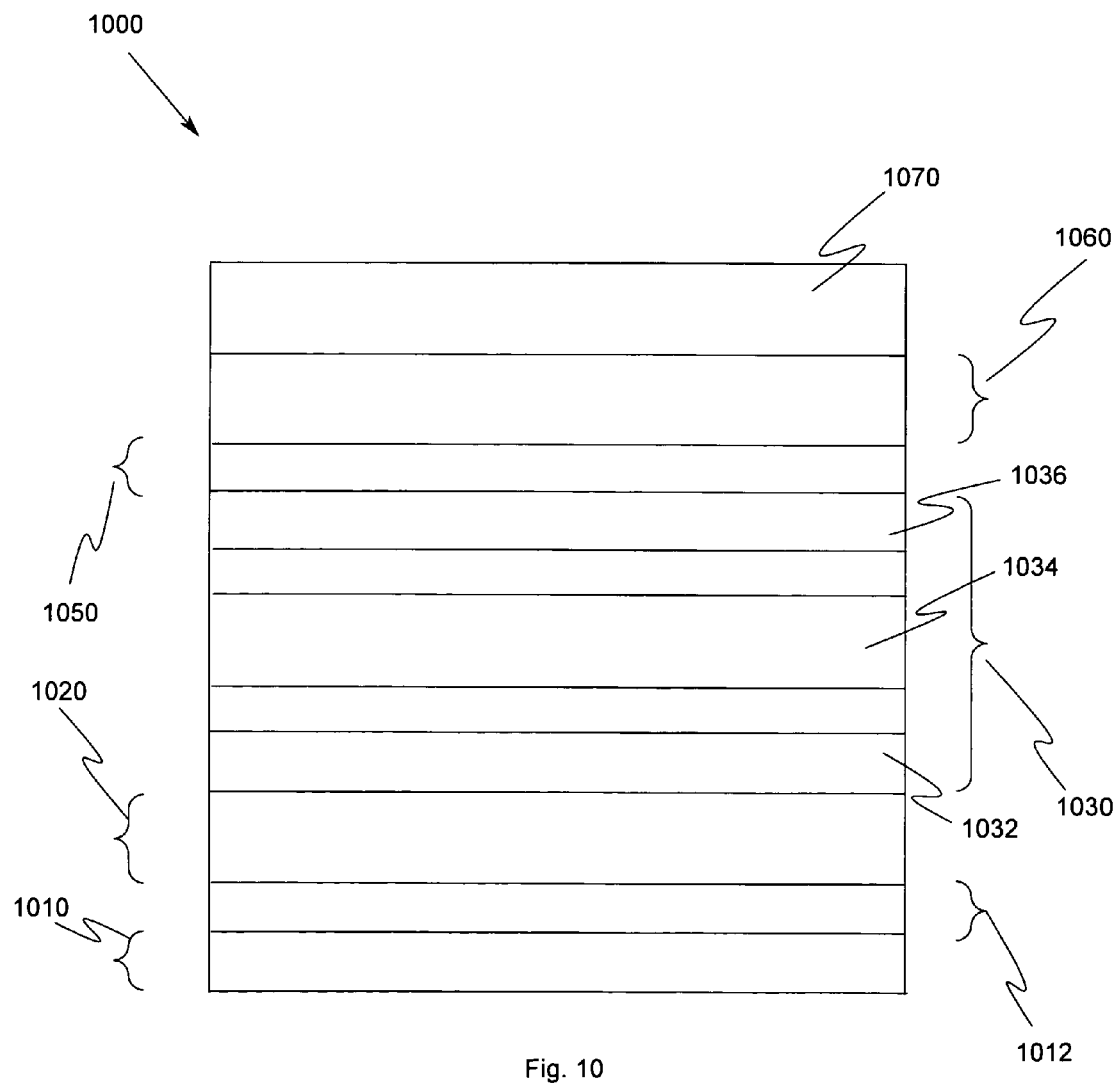
FIG. 10 illustrates a sensor stack according to an embodiment of the present invention.

FIG. 10 illustrates a sensor stack 1000 according to an embodiment of the present invention. In FIG. 10, a seed layer 1010 is formed and an underlayer 1012 is formed thereon. The seed layer 1010 may, for example, be a nickel-iron-chromium layer (NiFeCr). The underlayer 1012 may, for example, be a nickel-iron layer (NiFe). An antiferromagnetic pinning layer 1020 is formed over the underlayer 1012. The antiferromagnetic pinning layer 1020 may, for example, be an iridium-manganese-chromium (IrMnCr) or iridium-manganese (IrMn) layer. The pinned layer 1030 is formed over the antiferromagnetic pinning layer 1020. The pinned layer 1030 is a structure that includes three antiparallel pinned layers. The method for selecting the composition of the three antiparallel layer structure will be discussed herein below. Nevertheless, the pinned layer 1030 may, for example, be formed using a cobalt-iron layer having a content of iron of 25% ($CoFe_{25}$), a first ruthenium interlayer (Ru), an intermediate cobalt-iron alloy, a second ruthenium interlayer (Ru), and a cobalt-iron-boron (CoFeB) layer. The intermediate cobalt-iron alloy layer may include boron (B), silicon (Si), niobium (Nb) or nickel (Ni). In another embodiment, the intermediate cobalt-iron alloy layer may, for example, be $Co_{50}Fe_{50}$.

A barrier layer 1050 is formed over the three antiparallel layer pinned structure 1030. The barrier layer 1050 may, for example, be formed using magnesium-oxide (MgO). A free layer 1060 is formed over the barrier layer 1050. The free layer 1060 may be a layer of cobalt-iron-boron (CoFeB). A cap 1070 is formed over the free layer 1060.

The selection of the composition of the three antiparallel layers are selected to enable stronger exchange pinning, larger TMR and a decrease in flipping of the pinned layer under external stress. The first antiparallel layer 1032 (AP1) of the pinned structure 1030 is chosen (e.g., $CoFe_{25}$) to enhance coupling with the antiferromagnetic layer, e.g., IrMn. The third antiparallel layer 1036 (AP3) of the pinned structure 1030 is chosen (e.g., CoFeB) to enhance TMR. The composition of the second antiparallel layer 1034 (AP2) of the pinned structure 1030 is then chosen to balance the magnetic anisotropy of the first 1032 and third 1036 antiparallel layers, i.e., ($Hk_1 + Hk_3$), with the magnetic anisotropy of the second antiparallel layer 1034, i.e., $Hk_2$. Thus, the second antiparallel layer 1034 (AP2) allows freedom to select the desired material for reliability improvement without impacting performance. The magnetic anisotropy of the first 1032 and third 1036 antiparallel layers, i.e., ($Hk_1 + Hk_3$) is balanced against the magnetic anisotropy of the second antiparallel layer 1034, i.e., $Hk_2$. $CoFe_{50}$ is one example, but other alloys are also possible.

The design of the trilayer pinned structure maximizes Tunnel-Magneto-Resistance (TMR) and pinning while making the sensor less sensitive to external stress. For example, using $CoFe_{50}$ in the second antiparallel layer 1034 requires a 37 Å thick AP2 1034 to achieve near ΔM=0 and balance of stress induced anisotropies for AP1/AP2/AP3.

| | |
|---|---|
| (AP1) CoFe25/lambda/moment: | +8 × 10E−6, 22 KG, and |
| (AP3) [CoFe]80B20: | +8 × 10E−6, 15 KG, | thus to balance

| | |
|---|---|
| (AP2) CoFe50/Lambda/moment: | +16 × 10E−6, 24 KG |

Accordingly, the third antiparallel layer 1036 (AP3) provides little freedom in composition selection because the composition is selected to maximize the magnetoresistance. Likewise, the composition of the first antiparallel layer 1032 (AP1) is limited because the pinning strength if very strong when the content of iron in the CoFe layer is 25%. Nevertheless, the second antiparallel layer 1034 (AP2) provides the freedom to select the desired material for reliability improvement without impacting performance.

Figure 11:
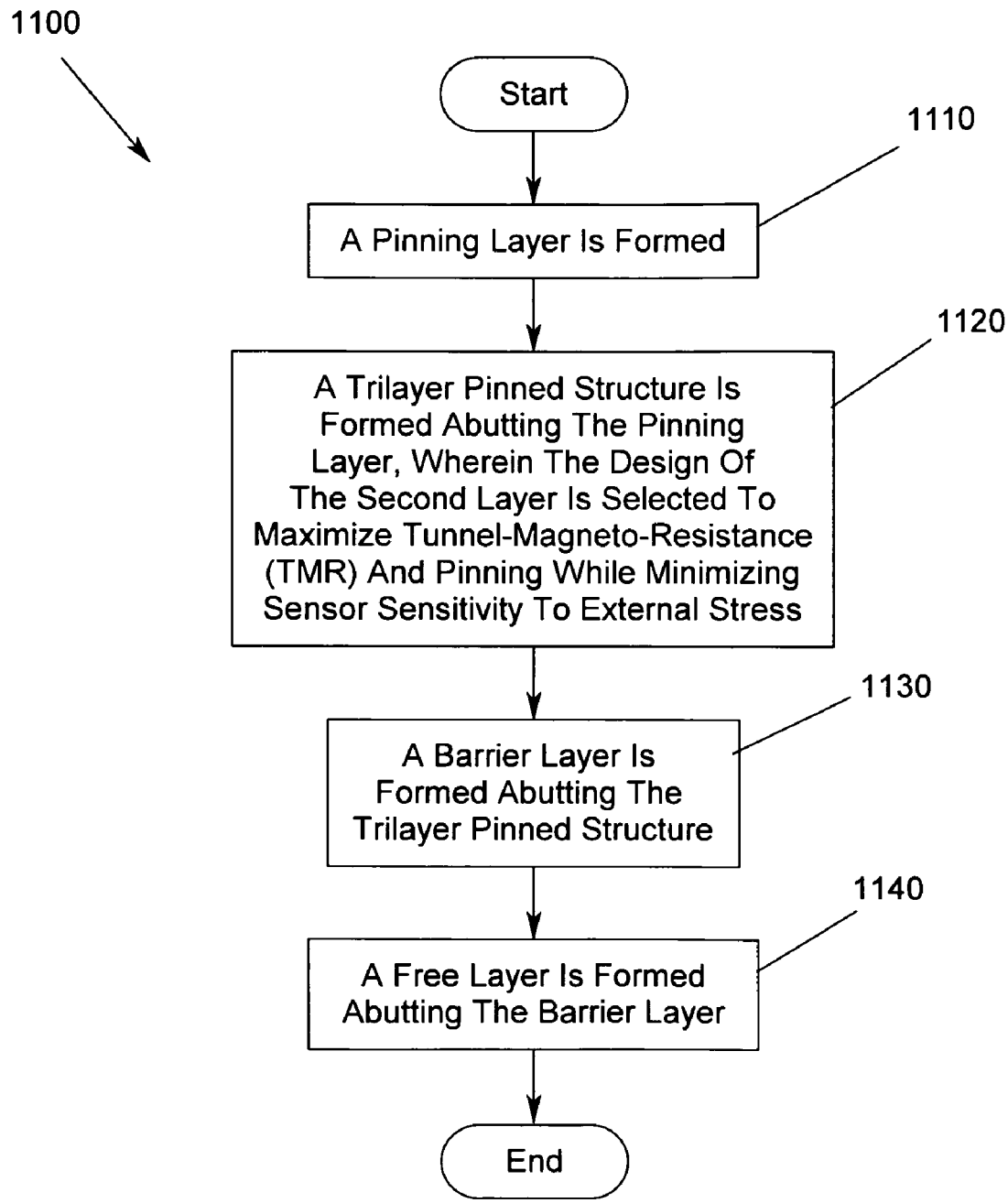
FIG. 11 is a flow chart of a method for forming a sensor having a higher saturation field and optimum sensitivity (dr/R) according to an embodiment of the present invention.

FIG. 11 is a flow chart 1100 of a method for forming a sensor having a higher saturation field and optimum sensitivity (dr/R) according to an embodiment of the present invention. A pinning layer is formed 1110. A trilayer pinned structure is formed abutting the pinning layer, wherein the design of the second layer is selected to maximize Tunnel-Magneto-Resistance (TMR) and pinning while minimizing sensor sensitivity to external stress 1120. A barrier layer is formed abutting the trilayer pinned structure 1130. A free layer is formed abutting the barrier layer 1140.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A read sensor, comprising:
an antiferromagnetic layer;
a pinned layer, the pinned layer further including a first, second and third antiparallel layer;
a free layer; and
a barrier layer disposed between the free layer and the pinned layer;
wherein the first antiparallel layer comprises a first alloy selected to maximize coupling with the antiferromagnetic layer, the third antiparallel layer comprises a second alloy selected to maximize a Tunnel-Magnetoresistance, and wherein the second antiparallel layer is disposed between the first and third antiparallel layers and comprises a third alloy selected to balance the stressed induced anisotropy of the first and third antiparallel layers, the first, second and third alloy having different compositions.

2. The read sensor of claim 1, wherein the third alloy of the second antiparallel layer is chosen to cause the magnetic anisotropy of the second antiparallel layer to equal the magnetic anisotropy of the first and third antiparallel layers.

3. The read sensor of claim 1 further comprising:
a seed layer; and
an underlayer formed between the seed layer and the antiferromagnetic layer.

4. The read sensor of claim 3, wherein the seed layer comprises a nickel—iron—chromium layer, the underlayer comprises a nickel—iron layer and the antiferromagnetic pinning layer comprises an iridium—manganese—chromium layer.

5. The read sensor of claim 3, wherein the seed layer comprises a nickel—iron—chromium layer, the underlayer comprises a nickel—iron layer and the antiferromagnetic pinning layer comprises an iridium—manganese layer.

6. The read sensor of claim 1, wherein the first alloy of the first antiparallel layer comprises a cobalt-iron layer having a content of iron of 25% and the second alloy of the third antiparallel layer comprises a cobalt-iron-boron layer.

7. The read sensor of claim 6, wherein the first and second antiparallel layers and the second and third antiparallel layers are separated by ruthenium interlayers.

8. The read sensor of claim 6, wherein the third alloy of the second antiparallel layer further comprises a cobalt-iron alloy that includes one additional element selected from the group comprising boron, silicon, niobium and nickel and having a percentage of iron content different from the iron content of the first alloy and an iron content of the second alloy.

9. The read sensor of claim 6, wherein the third alloy of the second antiparallel layer further comprises cobalt-iron alloy having a cobalt content of 50% and an iron content of 50%.

10. The read sensor of claim 1, wherein the barrier layer comprises a manganese oxide magnesium-oxide layer.

11. The read sensor of claim 1, wherein the free layer comprises a cobalt-iron-boron layer.

12. A magnetic storage device, comprising:
a magnetic media for storing data thereon;
a motor, coupled to the magnetic media, for translating the magnetic media;
a transducer for reading and writing data on the magnetic media; and
an actuator, coupled to the transducer, for moving the transducer relative to the magnetic media;
wherein the transducer includes a read sensor comprising:
an antiferromagnetic layer;
a pinned layer, the pinned layer further including a first, second and third antiparallel layer;
a free layer; and
a barrier layer disposed between the free layer and the pinned layer;
wherein the first antiparallel layer comprises a first alloy selected to maximize coupling with the antiferromagnetic layer, the third antiparallel layer comprises a second alloy selected to maximize a Tunnel-Magnetoresistance, and wherein the second antiparallel layer is disposed between the first and third antiparallel layers and comprises a third alloy selected to balance the stressed induced anisotropy of the first and third antiparallel layers, the first, second and third alloy having different compositions.

13. The magnetic storage device of claim 12, wherein the third alloy of the second antiparallel layer is chosen to cause the magnetic anisotropy of the second antiparallel layer to equal the magnetic anisotropy of the first and third antiparallel layers.

14. The magnetic storage device of claim 12, wherein the first alloy of the first antiparallel layer comprises a cobalt-iron layer having a content of iron of 25% and the second alloy of the third antiparallel layer comprises a cobalt-iron-boron layer.

15. The magnetic storage device of claim 14, wherein the third alloy of the second antiparallel layer further comprises a cobalt-iron alloy that includes one additional element selected from the group comprising boron, silicon, niobium and nickel and having a percentage of iron content different from the iron content of the first alloy and an iron content of the second alloy.

16. The magnetic storage device of claim 14, wherein the third alloy of the second antiparallel layer further comprises cobalt-iron alloy having a cobalt content of 50% and an iron content of 50%.

17. The magnetic storage device of claim 12, wherein the first and second antiparallel layers and the second and third antiparallel layers are separated by ruthenium interlayers.

18. The magnetic storage device of claim 12, wherein the barrier layer comprises a magnesium-oxide layer.

19. The magnetic storage device of claim 12, wherein the free layer comprises a cobalt-iron-boron layer.

* * * * *